(12) United States Patent
Giordano et al.

(10) Patent No.: US 6,851,389 B2
(45) Date of Patent: Feb. 8, 2005

(54) METHOD AND SYSTEM FOR TRANSPORTING LIVE POULTRY

(75) Inventors: Osvaldo Giordano, Caraglio (IT); Giuseppe Mola, Castelmella (IT); Massimo Zanotti, Brescia (IT)

(73) Assignees: Giordano Poultry Plast S.p.A., Cuneo (IT); Linco Italia S.r.l., Brescia (IT)

( * ) Notice: Subject to any disclaimer, the term of this patent is extended or adjusted under 35 U.S.C. 154(b) by 0 days.

(21) Appl. No.: 10/349,096

(22) Filed: Jan. 23, 2003

(65) Prior Publication Data

US 2003/0136350 A1 Jul. 24, 2003

(30) Foreign Application Priority Data

Jan. 23, 2002 (IT) .................................... TO2002A0066

(51) Int. Cl.[7] ............................................. A01K 31/07
(52) U.S. Cl. ...................................... 119/453; 119/462
(58) Field of Search ................................. 119/453, 462, 119/472, 455, 843; 220/529, 507, 554

(56) References Cited

U.S. PATENT DOCUMENTS

| | | | | | |
|---|---|---|---|---|---|
| 3,996,896 A | * | 12/1976 | Slaats et al. | ................. | 119/453 |
| 5,883,806 A | * | 3/1999 | Meador et al. | ............. | 700/244 |
| 6,109,215 A | * | 8/2000 | Jerome | ........................ | 119/843 |
| 6,347,604 B1 | * | 2/2002 | Lapere et al. | ................ | 119/843 |

FOREIGN PATENT DOCUMENTS

| | | |
|---|---|---|
| EP | 0 384 530 B1 | 5/1994 |
| GB | 2 129 672 A | 5/1984 |

* cited by examiner

*Primary Examiner*—Peter M. Poon
*Assistant Examiner*—Bethany L. Griles
(74) *Attorney, Agent, or Firm*—Sughrue Mion, PLLC

(57) ABSTRACT

A unit for transporting live poultry includes a supporting frame and a series of drawer-type cages open at the top, which can be at least partially extracted from the supporting frame in the direction of one side, either the back side or one lateral side, of the transporting unit other than the front side at which the poultry are introduced into the drawer-type cages.

5 Claims, 2 Drawing Sheets

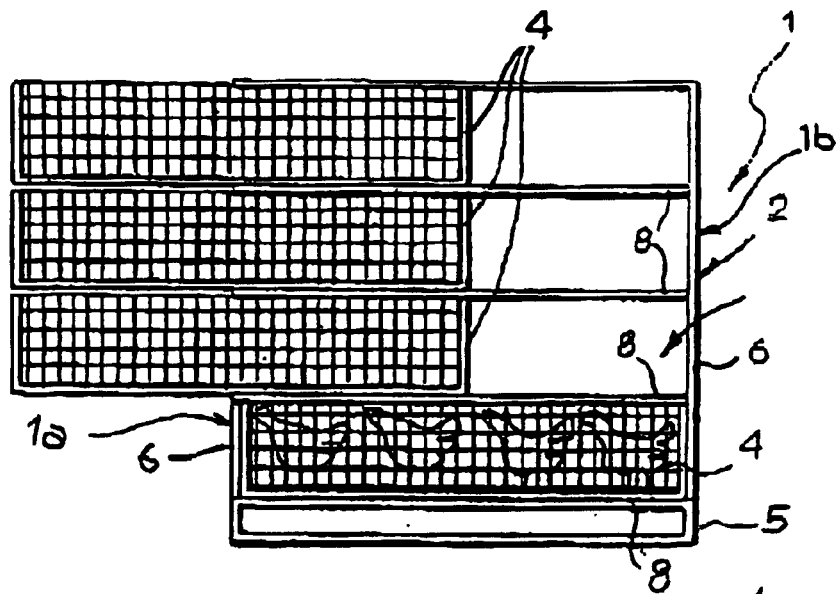
Fig_1
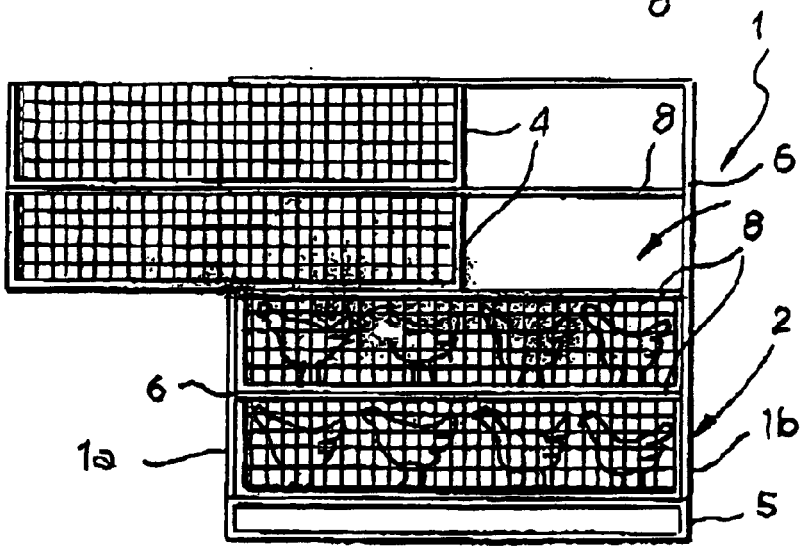
Fig_2
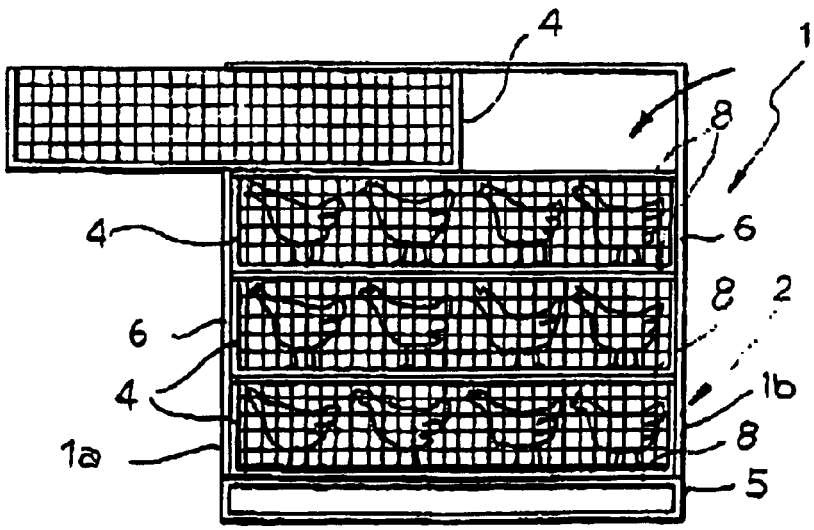
Fig_3

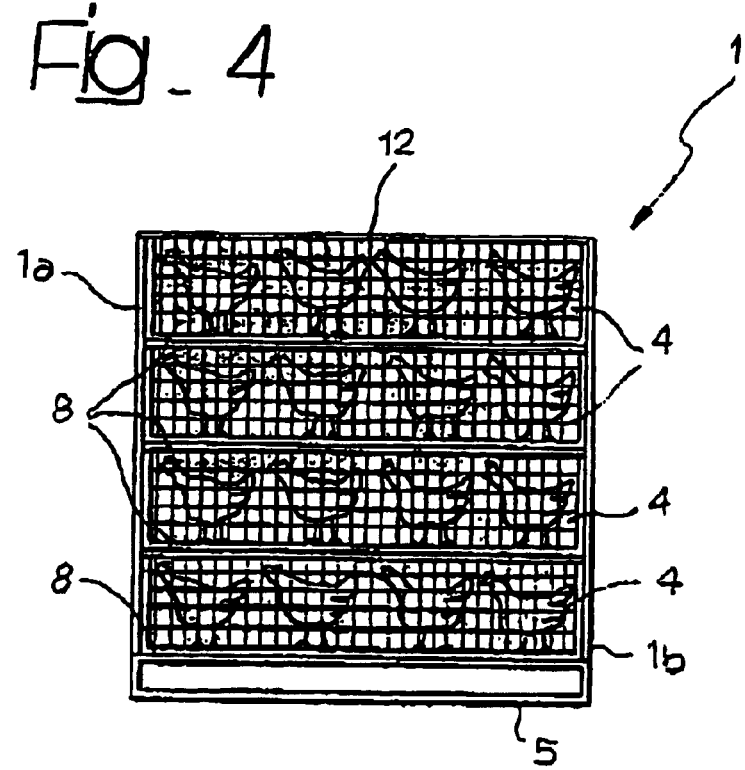
Fig_4
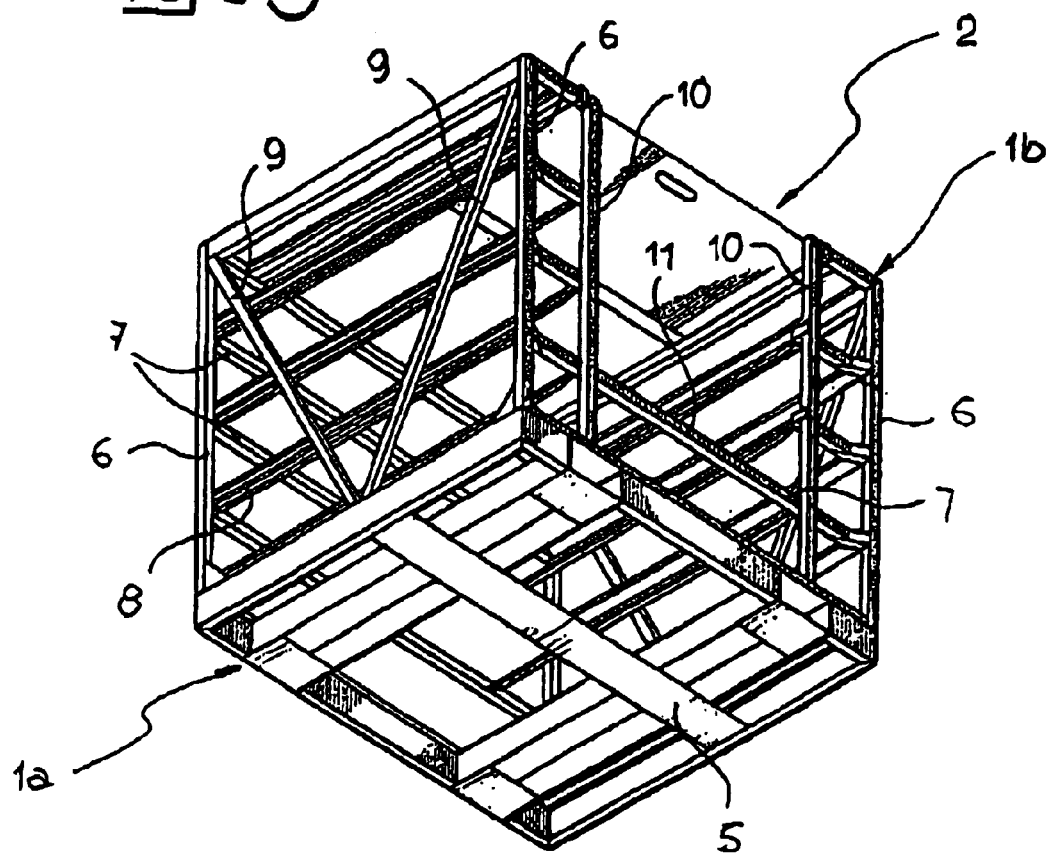
Fig_5

METHOD AND SYSTEM FOR TRANSPORTING LIVE POULTRY

BACKGROUND OF THE INVENTION

The present invention relates in general to the handling of live animals and regards more in particular a method and a system for transporting live poultry from where they are reared to the place of slaughter.

STATE OF THE PRIOR ART

Traditionally, in applications of this sort, transporting units are used, which include a supporting frame and a series of drawer-type cages, which are open at the top and are carried by the supporting frame in a mutually superimposed condition. The drawer-type cages can be extracted either completely or in part from the supporting frame in order to enable loading of the poultry inside them and are then repositioned inside the frame, which is then transferred on board a transporting vehicle and sent to the slaughter house, where the poultry is unloaded from the drawer-type cages. The operations of loading and unloading of the poultry can be carried out manually or else, more conveniently, using mechanized equipment.

Transporting units of the type specified above are known, for example, from the British patent application GB-A-2129672 in the name of Anglia Autoflow Limited, according to which the arrangement of the transporting unit is such that the drawer-type cages are each time extracted partially in the direction of the front side of the frame, i.e., in the direction of the side at which the poultry are introduced, the drawer-type cages on top being kept inserted in the frame. When the drawer-type cage that has been filled is once again completely inserted into the frame, the poultry that have been put therein tend to undergo traumas due to the impact against the bottom of the drawer-type cage set above them, with the risk of bruising and injury.

A different solution for a unit designed for transporting live poultry is known from the European patent EP-B-0384530 in the name of Stork P M T B. V., the arrangement of which is such that the bottom wall of each drawer-type cage, together with a corresponding side wall, is able to slide in the plane of the bottom wall so as to reduce, namely by approximately one half, the longitudinal extension of the drawer-type cage. In this way, it is possible to free access to the drawer-type cages set underneath by causing the mobile parts of the bottom walls of the drawer-type cages set above to be set in. As each drawer-type cage set underneath is filled, the mobile part of the bottom wall of the drawer-type cage immediately above is extended in order to carry out filling of said cage until loading is completed.

Also the above arrangement involves a series of drawbacks, in particular as regards the structural complexity of the drawer-type cages and the subsequent step of unloading the poultry from the drawer-type cages, if it is borne in mind that they are carried by the frame in a stationary condition and hence cannot be extracted. Unloading of the poultry from the cages thus involves the need to tip up the entire transporting unit, i.e., it involves the frame with the drawer-type cages contained therein being tipped up, with the consequent need to pre-arrange for appropriate tipping equipment to be provided and with the risk of inflicting further traumas on the animals.

SUMMARY OF THE INVENTION

The object of the present invention is to overcome the drawbacks of the two known solutions referred to above and to propose a method and a system for transporting live poultry in transporting units of the type defined above which will enable the operations of introducing the poultry into the drawer-type cages to be simplified and rendered more convenient, without jeopardizing or adversely interfering with the ease of the subsequent operation of unloading the poultry at the end of the transportation step.

According to the present invention, the above purpose is achieved basically thanks to the fact that the supporting frame of the transporting unit is arranged for enabling at least partial extraction of said drawer-type cages in the direction of one side of the unit other than the front side, which is used for introducing the poultry into said drawer-type cages.

The side on which there is at least partial extraction may be the back one, i.e. the one opposite to the front side at which the poultry are put in, or else one or other of the lateral sides set at right angles to the front side where the poultry are put in.

With such an arrangement, the step of loading the poultry is carried out, at the front side of the transporting unit, according to the following procedure:

extracting, at least partially in the direction of one side of the transporting unit other than the front side used for introduction of the poultry, the drawer-type cages situated above the drawer-type cage set in a lowermost position of said transporting unit;

introducing the poultry into said lowermost drawer-type cage, until the cage is completely filled;

setting in, on top of said lowermost drawer-type cage, the drawer-type cage immediately above it in such a way that the bottom of the latter cage defines the lid of the former cage; and repeating the same procedure until the uppermost drawer-type cage has been filled and setting on top of the uppermost cage a covering element as a lid.

With the above solution, loading of the poultry into the transporting unit is carried out with results corresponding to the ones obtained according to the solution described in EP-B-0384530, and hence limiting the risk of traumas for the poultry, but without any constructional complications as regards the drawer-type cages, whilst the operations for unloading the cages can be carried out in a way similar to the system proposed in the document GB-A-2129672, i.e., by simply extracting the drawer-type cages from the frame without any need to tip up the entire transporting unit, and hence reducing the complexity and cost of the unloading equipment.

BRIEF DESCRIPTION OF THE DRAWINGS

The present invention will now be described in detail, with reference to the attached drawings, which are provided purely by way of non-limiting example and in which:

FIG. 1 is a schematic view, in side elevation, of a transporting unit used in the method and system for transporting live poultry according to the invention, represented in a first operating condition;

FIGS. 2, 3 and 4 are views similar to FIG. 1, which illustrate the transporting unit in subsequent operating conditions; and FIG. 5 is a perspective view, from underneath, of the frame of the transporting unit.

DETAILED DESCRIPTION OF THE INVENTION

With reference to the above drawings, number 1 designates, as a whole, a transporting unit used in a system for transporting live poultry from where they are reared to the place of slaughter.

The unit 1 basically consists of a sturdy metal frame 2, illustrated in detail in FIG. 5, which has a generally parallelepipedal shape and is pre-arranged for supporting a plurality (in the example illustrated, four) of drawer-type cages 4.

The drawer-type cages 4 are of a generally known type and, for reasons of brevity, will not be described in detail herein. For the purposes of the present invention, it is sufficient to clarify that said drawer-type cages 4 are conveniently made of a single parallelepipedal body made of moulded plastic material with a bottom wall and side walls, open at the top. The drawer-type cages 4 are conveniently similar to the ones that have been manufactured and marketed for some time by Giordano Poultry Plast S.p.A. of Caraglio (Italy) and described in the European patent EP-B-0867113 filed in the name of Giordano Poultry Plast S.p.A., with possible slight structural modifications. The said modifications may, for instance, regard the conformation of the perforated bottom of the drawer-type cage 4, the perforations of which may consist—instead of circular holes as in the case of EP-B-0867113—elongated and/or cross-shaped slits.

The frame 2 comprises a base 5 shaped like a pallet, which can be handled by the forks of a fork-lift truck or the like, vertical uprights 6, horizontal elements 7, 8, and possible diagonal reinforcements 9.

The horizontal elements 8 define pairs of slide guides for the four drawer-type cages 4 between a position where they are set in inside the frame 2, as represented in FIG. 4, where they are set one on top of the other, i.e. mutually superimposed, with the bottom wall of the cage set above defining the lid of the cage set underneath, and a condition where the cage is partially or completely extracted from the frame 2.

Extraction of the drawer-type cages 4 from the frame 2 is possible according to the invention only in the direction of the back side of the unit 1, i.e., the one designated by 1a, whereas it is prevented in the direction of the front side designated by 1b. For this purpose, the frame 2 may have, on the front side 1b additional vertical elements 10 and horizontal elements 11, which prevent the drawer-type cages 4 from coming out.

With the arrangement as described above, loading of live poultry into the transporting unit 1 is performed in the way represented in FIGS. 1 to 3. Initially (see FIG. 1) the three drawer-type cages 4 set above the lowermost drawer-type cage 4 are partially extracted from the frame 2 by being made to slide—for approximately one half of their longitudinal extension—along the slide guides 8 in the direction of the back side 1a of the transporting unit 1. In this way, the lowermost drawer-type cage 4 is rendered immediately accessible from above, through the front side 1b of the unit 1, for at least one half of its longitudinal extension so as to enable convenient and easy introduction of the poultry inside the cage.

Once the lowermost drawer-type cage 4 has been filled, the drawer-type cage 4 immediately above it is brought into the original set-in condition in such a way that its bottom wall closes completely the drawer-type cage 4 set underneath it as a lid. Next, the second drawer-type cage 4 is filled, keeping the third and the fourth drawer-type cages in the partially extracted condition (see FIG. 2).

Once the second lowest drawer-type cage 4 has been filled, the third drawer-type cage 4 is brought back into the set-in condition so as to close the second drawer-type cage at the top. Then, the third drawer-type cage 4 is filled (see FIG. 3).

Next the fourth drawer-type cage 4 is positioned in the set-in condition and is filled.

At the end of the above operation, a covering plate 12 is applied to the top of the frame 2, the said plate functioning as a lid for the uppermost drawer-type cage 4.

Once filling is completed, the unit 1 is transferred onto a transportation vehicle and is sent away to the slaughter house, where the poultry contained inside the drawer-type cages 4 are unloaded onto the corresponding equipment simply by extracting the drawer-type cages 4 from the back side 1a of the unit 1.

From the foregoing description, it will appear clearly that the system and method for transporting live poultry according to the invention renders the operations of loading of the poultry inside the drawer-type cages 4 extremely convenient and safe, without in the least altering or adversely affecting the subsequent unloading operations, using a structure which is cut down to the minimum and hence relatively inexpensive.

Of course, the details of construction and the embodiments of the transporting unit described herein may undergo ample variations with respect to what is described and illustrated, without thereby departing from the scope of the present invention as this is defined in the ensuing claims.

Thus, for example, although in the case of the embodiment described with reference to the attached drawings, the side of the transporting unit 1 towards which the drawer-type cages 4 are partially extracted for the steps of loading is the back side 1a opposite to the side 1b for introduction of the poultry, it is to be pointed out that, according to a variant embodiment (not illustrated) the drawer-type cages 4 could, instead, be extracted in the direction of one or the other side of the unit 1 set at right angles to the said front side 1b.

What is claimed is:

1. A method for transporting live poultry comprising the steps of providing at least one transporting unit including a supporting frame and a series of drawer-type cages having an open top and are carried by the supporting frame in a mutually superimposed condition, loading the poultry inside said drawer-type cages, and transferring said transporting unit to a station for unloading the poultry, wherein the step of loading the poultry is carried out at the front side of said transporting unit, according to the following procedure:

extracting at least partially in the direction of one side of said transporting unit other than the front side thereof used for introduction of the poultry, the drawer-type cages situated above a drawer-type cage set in a lowermost position of said transporting unit;

introducing the poultry into said lowermost drawer-type cage, until said cage is substantially completely filled from above through said open top;

setting in, on top of said lowermost drawer-type cage, the drawer-type cage immediately above it in such a way that the bottom of the latter cage defines the lid of the former cage; and repeating the same procedure until the uppermost drawer-type cage has been filled and setting on top of the top cage a covering element as a lid.

2. The method according to claim 1, wherein said steps of extracting and setting in said drawer-type cages are carried out by making the latter slide along guides of said supporting frame.

3. The method according to claim 1, wherein said drawer-type cages are extracted in the direction of the back side (1*a*) of said transporting unit.

4. The method according to claim 1, wherein said drawer-type cages are extracted in the direction of one lateral side of said transporting unit, set at right angles to said front side (1*b*).

5. The method according to claim 1, wherein said drawer-type cages are extracted substantially for one half of their longitudinal extension.

\* \* \* \* \*